(12) United States Patent
Seo

(10) Patent No.: US 7,945,299 B2
(45) Date of Patent: May 17, 2011

(54) MULTIPLE TORSION SPRING AND SEMI-AUTOMATIC SLIDING DEVICE USING THE SAME

(75) Inventor: Jung-Hwan Seo, Seoul (KR)

(73) Assignee: Samsung Electronics Co., Ltd (KR)

( * ) Notice: Subject to any disclaimer, the term of this patent is extended or adjusted under 35 U.S.C. 154(b) by 728 days.

(21) Appl. No.: 11/870,870

(22) Filed: Oct. 11, 2007

(65) Prior Publication Data

US 2008/0089036 A1    Apr. 17, 2008

(30) Foreign Application Priority Data

Oct. 17, 2006  (KR) .................. 10-2006-0101074

(51) Int. Cl.
*H04M 1/00*    (2006.01)
(52) U.S. Cl. ............... 455/575.4; 455/575.1; 455/575.8; 455/90.3
(58) Field of Classification Search ............... 455/575.4, 455/575.1, 575.8, 90.3
See application file for complete search history.

(56) References Cited

U.S. PATENT DOCUMENTS

| | | | | |
|---|---|---|---|---|
| 7,599,723 | B2 * | 10/2009 | Lee et al. ................ | 455/575.4 |
| 2006/0178176 | A1 * | 8/2006 | Kwak et al. ............ | 455/575.4 |
| 2006/0180457 | A1 | 8/2006 | Han et al. | |
| 2007/0243912 | A1 * | 10/2007 | Lee et al. ................ | 455/575.4 |
| 2009/0029748 | A1 * | 1/2009 | Lee ......................... | 455/575.4 |

FOREIGN PATENT DOCUMENTS

| | | |
|---|---|---|
| EP | 1 150 476 | 10/2001 |
| JP | 2004-253526 | 9/2004 |
| JP | 2005159633 | 6/2005 |
| JP | 2006-050204 | 2/2006 |
| KR | 20-0365340 | 10/2004 |
| KR | 20-0365393 | 10/2004 |
| KR | 1020050019808 | 9/2005 |
| KR | 20-0403708 | 12/2005 |
| KR | 20-0416094 | 5/2006 |
| KR | 1020060038419 | 5/2006 |
| KR | 20-0419120 | 6/2006 |
| WO | WO 2006/031078 | 3/2006 |

* cited by examiner

*Primary Examiner* — Sanh D Phu
(74) *Attorney, Agent, or Firm* — The Farrell Law Firm, P.C.

(57) ABSTRACT

Disclosed are a multiple torsion spring employed in a sliding-type portable communication terminal and a semi-automatic sliding device employing the same. The multiple torsion spring is a spring employed in a semi-automatic sliding device for a sliding-type portable communication terminal, wherein the spring comprises opposite ends and at least two coil spring sections. The spring is formed in a zigzag shape.

8 Claims, 6 Drawing Sheets

MULTIPLE TORSION SPRING AND SEMI-AUTOMATIC SLIDING DEVICE USING THE SAME

PRIORITY

This application claims the benefit under 35 U.S.C. §119 (a) of an application filed in the Korean Industrial Property Office on Oct. 17, 2006 and assigned Serial No. 2006-0101074, the contents of which are hereby incorporated by reference.

BACKGROUND OF THE INVENTION

1. Field of the Invention

The present invention relates to a portable terminal, such as a Digital Multimedia Broadcasting (DMB) phone, a game phone, a chatting phone, a camera phone, an MP3 phone, a cellular phone, a PCS (Personal Communications Service) phone, a PDA (Personal Digital Assistant), an HHP (Hand Held Phone), and in particular, to a semi-automatic sliding device for a sliding-type portable terminal.

2. Description of the Related Art

In general, the term "portable terminal" typically means an appliance for allowing a user to have a wireless communication with a counterpart while carrying such a portable terminal. For example, such a wireless communication function includes a voice communication function, a message transmission function, a file transmission function, an image communication function, a camera function, etc. In addition, such a portable communication terminal conducts the role of a private secretary for managing phone numbers, private schedules, etc.

In consideration of portability, such portable terminals are being miniaturized, slimmed, narrowed and lightened, and are also tending toward multi-media which can seek more various functions, whereby entertainment contents including games and recreation are regarded as important. In the future, it is expected that this trend will be changed to integrate multiple functions including an image communication, a game function, an internet function, and a camera function beyond a simple voice communication into a portable terminal.

Conventional portable communication terminals may be classified into bar-type or folder-type depending on the external appearances thereof. A bar-type communication terminal has a single housing configured in a bar shape, wherein a data input device, a data output device, an antenna device, a transmitter, and a receiver are provided in the single housing. A folder-type communication terminal has a folder rotatably connected to a bar-type housing through a hinge device.

In addition, portable communication terminals may be classified into swing-type or sliding-type depending on the opening and closing methods thereof. A swing-type communication terminal has two housings which are retained in the opposed position with each other in such a manner that when one of the housings is swung, the other is opened or closed. A sliding-type communication terminal has two housings which are oppositely assembled to each another in such a manner that when one of the housings is slid in the longitudinal direction, the other is opened or closed.

For example, a sliding-type portable communication terminal is configured in such a manner that a main housing and a sliding housing are oppositely assembled to each other through a sliding device.

A sliding device employed in a conventional sliding-type portable terminal is disclosed in detail in Japanese Patent Application No. 2003-393949.

However, the sliding device disclosed in the above-mentioned Japanese Patent Application has a structure of which slimming is difficult. Therefore, the above-mentioned Japanese Patent Application is not proper for slimming of a sliding-type portable communication terminal.

In addition, another sliding device employed in a conventional sliding-type communication terminal is disclosed in detail in Korean Patent Application No. 2005-19808.

However, the sliding apparatus has a disadvantage in that it is difficult to slim, has many parts to be assembled, and reveals a problem in opening and closing movements because a dead point exists when sliding.

SUMMARY OF THE INVENTION

Accordingly, the present invention has been made to solve the above-mentioned problems occurring in the prior art, and the present invention provides a multiple torsion spring for a sliding-type portable terminal, which is advantageous for slimming the portable communication terminal, and a semi-automatic sliding device employing the same.

In addition, the present invention provides a multiple torsion spring in which three coil spring sections are arranged in a zigzag pattern, so that the deformation of the torsion spring can be maximized, and the elastic force exerted by the torsion spring can be increased, and a semi-automatic sliding device employing the same.

In addition, the present invention provides a multiple torsion spring having the three coil spring sections adapted to move along predetermined tracks, respectively, so that a dead section or a dead point can be removed while the sliding housing is being slid, and a semi-automatic sliding device employing the same.

Furthermore, the present invention provides a multiple torsion spring having a central coil spring section and first and second coil sections, wherein the distances from the central coil spring section to the first and to second coil spring sections are reduced, thereby being advantageous in miniaturizing such a multiple torsion spring and allowing the vertical floating of the sliding housing to be minimized when the sliding housing moves in the longitudinal direction thereof, and a semi-automatic sliding device employing the same.

Moreover, the present invention provides a multiple torsion spring, the configuration of the torsion spring being very simple, so that the assembly steps of the torsion spring can be reduced, whereby the manufacturing costs can be reduced, and a semi-automatic sliding device employing the same.

According to an aspect of the present invention, there is provided a spring employed in a semi-automatic sliding device for a sliding-type portable communication terminal, comprising opposite ends, and at least two coil spring sections, the spring being formed in a zigzag shape.

According to another aspect of the present invention, there is provided a semi-automatic sliding device for a sliding-type portable communication terminal which includes a main housing, a sliding housing, and a semi-automatic sliding device for opening or closing the sliding housing in relation to the main housing, wherein the semi-automatic sliding device includes a top surface of the main housing; a bottom surface of the sliding housing; and a multiple torsion spring comprising a fixed end rotatably attached to the top surface of the main housing at a predetermined location, a moving end rotatably attached to the bottom surface of the sliding housing at an other predetermined location and moving with the sliding housing, and at least two coil spring sections, the multiple torsion spring being formed in a zigzag shape.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, exemplary embodiments of the present invention will be described with reference to the accompanying drawings. In the following description, a detailed description of known functions and configurations incorporated herein will be omitted for conciseness and clarity.

Figure 1:
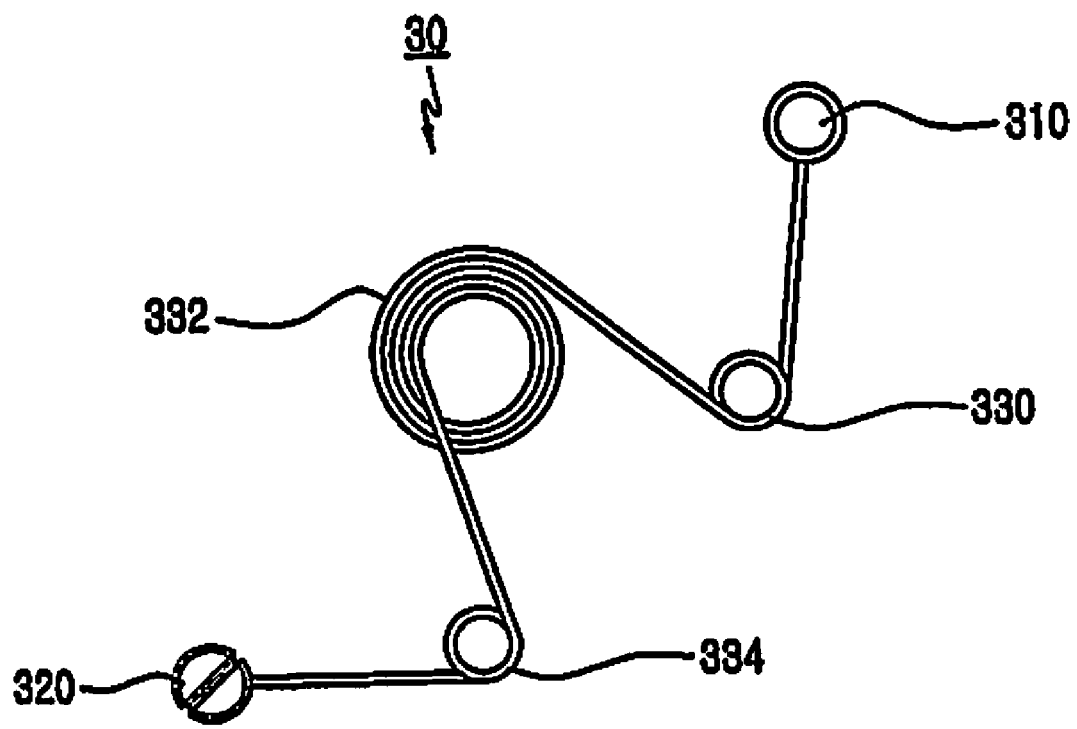
FIG. 1 is a front view of a multiple torsion spring employed in a semi-automatic sliding device for a sliding-type portable communication terminal according to the present invention.

Referring to FIG. 1, the configuration of a spring employed in a sliding device for a sliding-type portable communication terminal according to the present invention will be described. As shown in FIG. 1, the inventive spring is a torsion spring, and is preferably a multiple torsion spring 30. The multiple torsion spring 30 has opposite ends 310 and 320, between which the multiple torsion spring 30 is formed in a zigzag shape and includes at least three coil spring sections 330, 332 and 334. The multiple torsion spring 30 is configured in a "W" shape.

The coil spring sections are positioned between the opposite ends 310 and 320, wherein one of the opposite ends is a fixed end 310 and the other is a moving end 320. The coil spring sections include a first coil spring section 330, a central coil spring section 332 connected to the first coil section 330 and wound spirally at least two turns, and a second coil spring section 334 connected to the central coil spring section 332 and positioned symmetrically to the first coil spring section 330 about the central coil spring section 332. The first and second coil spring sections 330 and 334 exert expanding elastic force in the direction rendering them to be spaced away from each other, and the central coil spring section 332 exerts expanding elastic force in the direction rendering the opposite ends 310 and 320 to be spaced away from each other.

Figure 2:
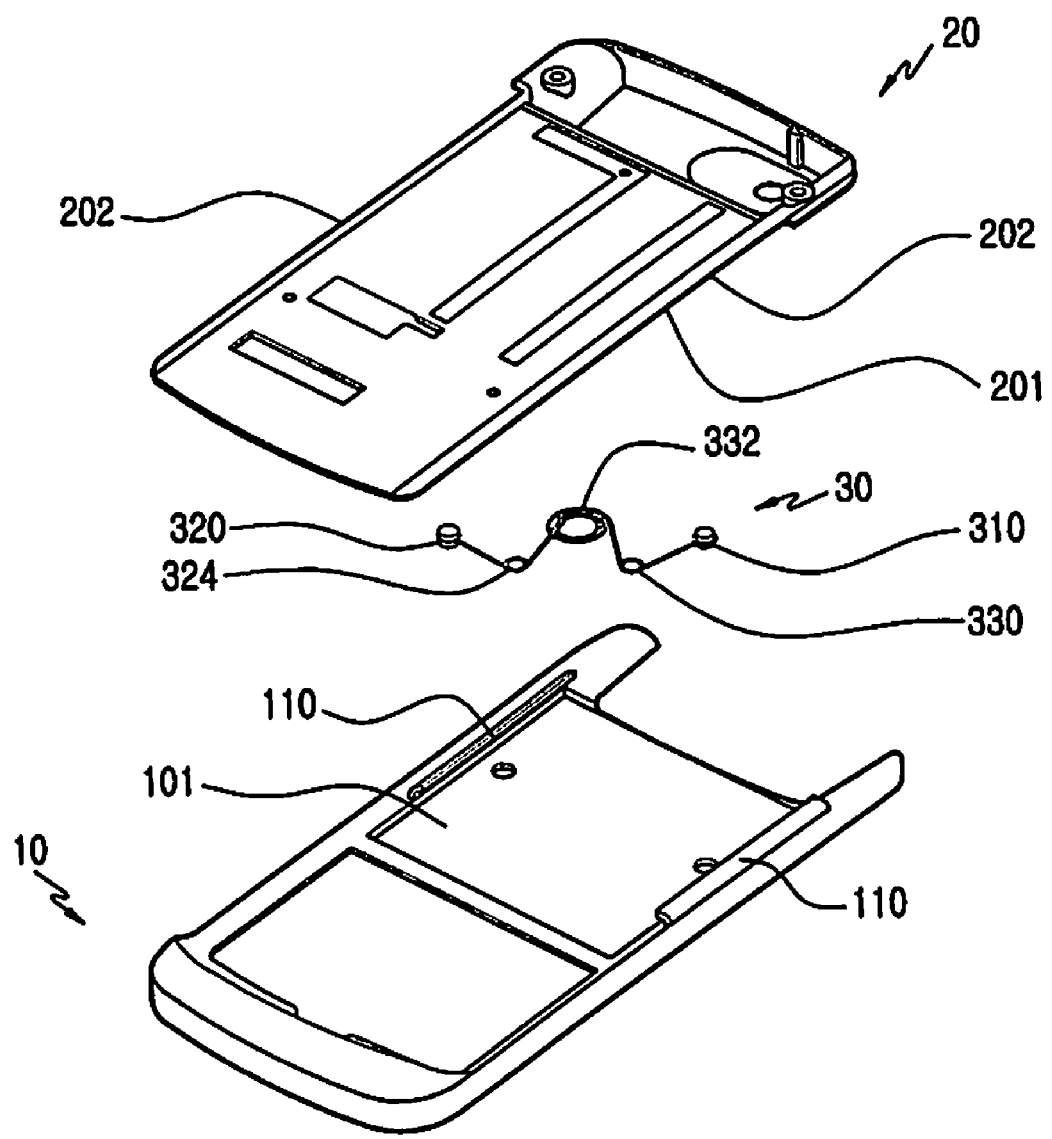
FIG. 2 is an exploded perspective view of a semi-automatic sliding device according to the present invention.
Figure 3:
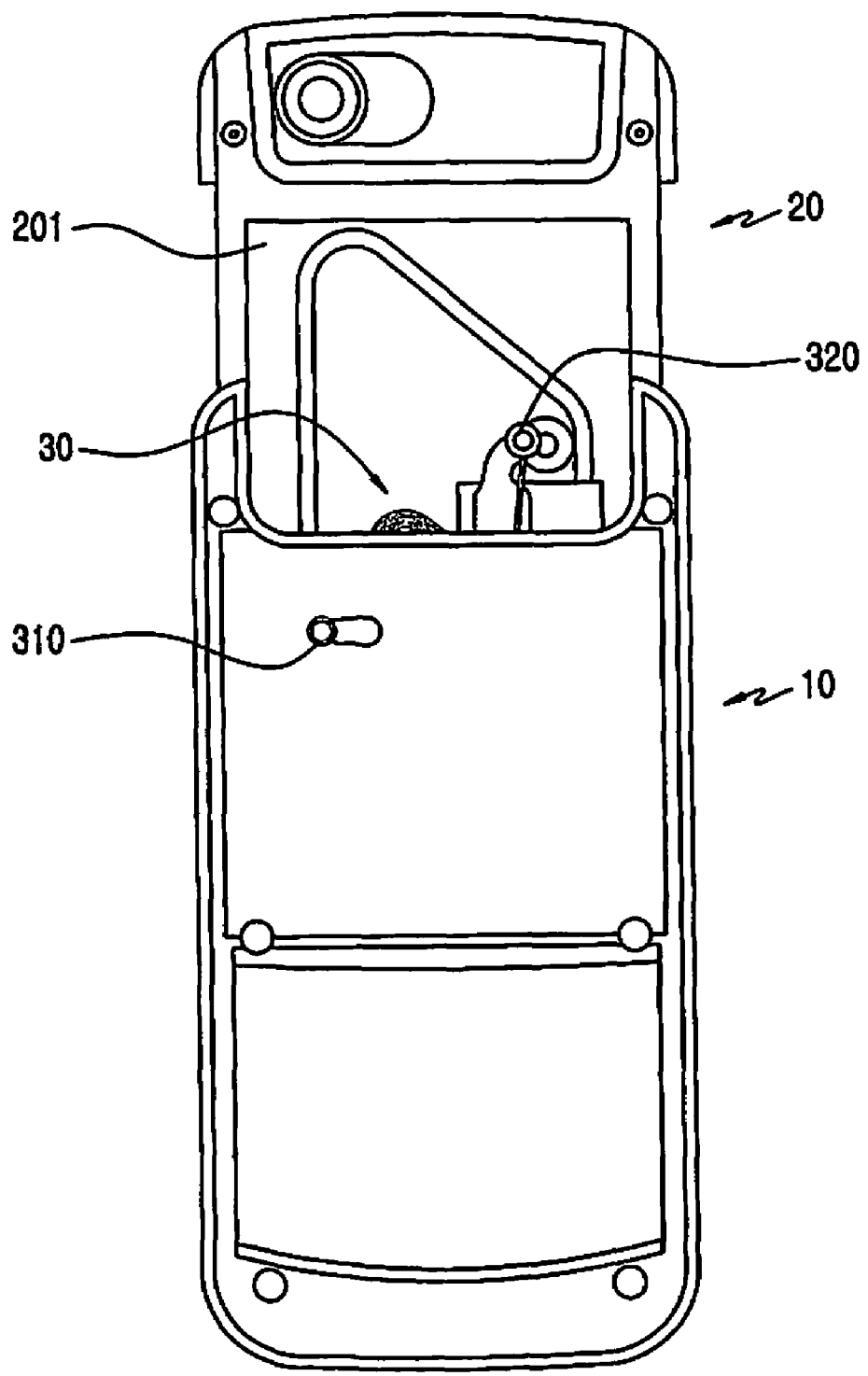
FIG. 3 is a bottom view of a portable communication terminal employing the inventive semi-automatic sliding device.
Figure 4:
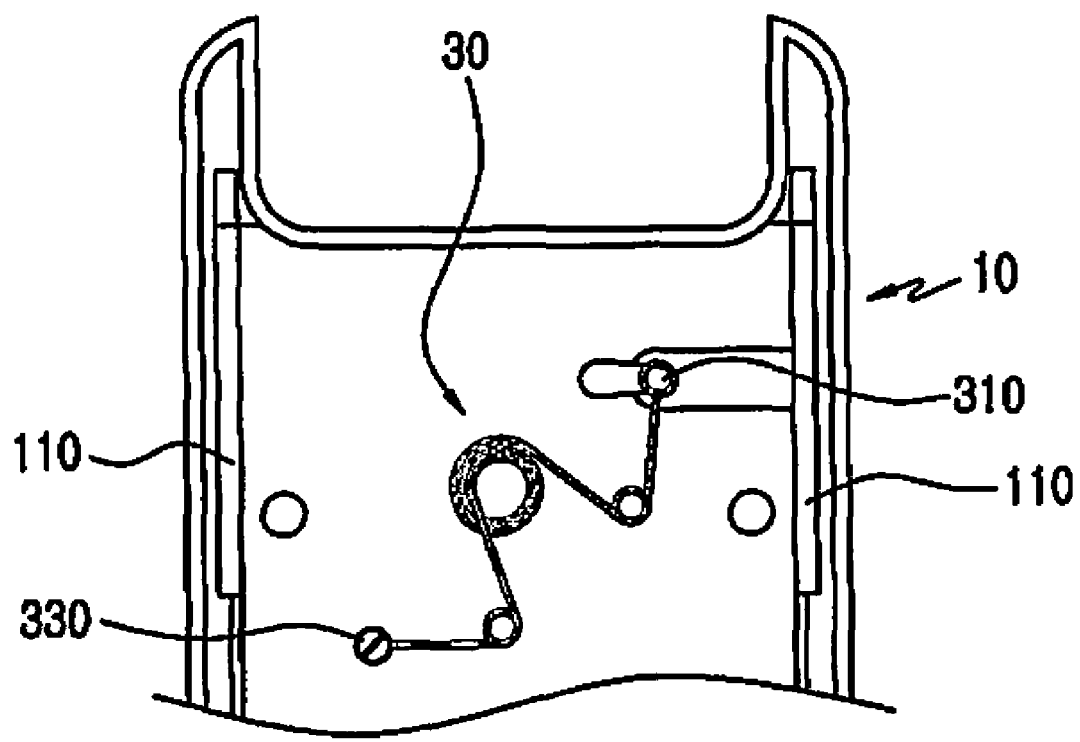
FIG. 4 is a front view illustrating the inventive multiple torsion spring mounted on the top area of the main housing.

Referring to FIGS. 2 to 6, description will be made in relation to a semi-automatic sliding device employing the inventive multiple torsion spring 30. As shown in FIGS. 2 and 3, the multiple torsion spring 30 serves as a driving power source for a sliding-type portable communication terminal for providing force to close the communication terminal in a section within a predetermined distance and providing force to open the communication terminal in a section beyond the predetermined distance. Of course, the section within the predetermined distance means a section where compulsory force is provided by a user, and the section beyond the predetermined distance means a section where driving force is provided by the multiple torsion spring.

The inventive semi-automatic sliding device includes a top surface 101 of a main housing 10 and a bottom surface 201 of a sliding housing 20, the semi-automatic sliding device being provided so as to close or open the sliding housing 20 in relation to the main housing 10. The top surface 101 may be formed integrally with the main housing 10 by a fabrication process such as injection molding, or formed separately from the main housing 10 and assembled to the main housing 10. In addition, the bottom surface 201 may be formed integrally with the sliding housing 20, or formed separately from the sliding housing 20 and assembled to the sliding housing 20. Furthermore, a pair of guide rails 110 are formed at the opposite side edges on the top surface 101, so that the opposite side edges 202 of the bottom surface 201 are fitted to the guide rails 110, thereby being guided along the guide rails 110.

The semi-automatic sliding device provides force to close the sliding housing 20 when the sliding housing 20 is positioned in a section within a predetermined distance from the main housing 10, and provides force to open the sliding housing 20 when the sliding housing 20 is positioned in a section beyond the predetermined distance. Of course, the section within the predetermined distance means a section where compulsory force is provided by a user, and the section beyond the predetermined distance means a section where driving force is provided by the multiple torsion spring 30.

The semi-automatic sliding device is configured by the top surface 101, the bottom surface 201, and the multiple torsion spring 30, wherein the torsion spring 30 includes a fixed end 310 rotatably attached to the top surface 101 of the main housing 10 at a predetermined location, and a moving end 320 rotatably attached to the bottom surface 201 and moving with the sliding housing 20.

The multiple torsion spring 30 has opposite ends 310 and 320, between which the multiple torsion spring 30 is formed in a zigzag shape and includes at least three coil spring sections 330, 332 and 334. The multiple torsion spring 30 is configured in a "W" shape.

The coil spring sections are positioned between the opposite ends 310 and 320 and include a first coil spring section 330, a central coil spring section 332 connected to the first coil section 330 and wound spirally at least two turns, and a second coil spring section 334 connected to the central coil spring section 332 and positioned in symmetry to the first coil spring section 330 about the central coil spring section 332. The first and second coil spring sections 330 and 334 exert expanding elastic force in the direction rendering them to be spaced away from each other, and the central coil spring section 332 exerts expanding elastic force in the direction rendering the opposite ends 310 and 320 to be spaced away from each other.

Each of the first and second coil spring sections 330 and 334 is formed by being wound one turn, and the central coil spring 332 is wound at least two turns, preferably three turns. In addition, the turns of the coil spring 332 are not formed in the same diameter, but formed in such a manner that the diameters thereof are reduced when approaching the center of the coil spring 332, whereby the coil spring 332 can be formed in a slim configuration.

In addition, each of the fixed end 310 and the moving end 320 of the multiple torsion spring is provided with a fastener such as a rivet, so that the fixed end 310 can be attached to the top surface 101 by anchoring the rivet at the bottom surface of the main housing 10, and the moving end 320 can be attached to the bottom surface 201 by anchoring the rivet at the top surface of the sliding housing 20, wherein the rivets are engaged with the fixed and moving ends 310 and 320, respectively, by being formed through a fabrication process such as insert-injection molding.

Figure 5:
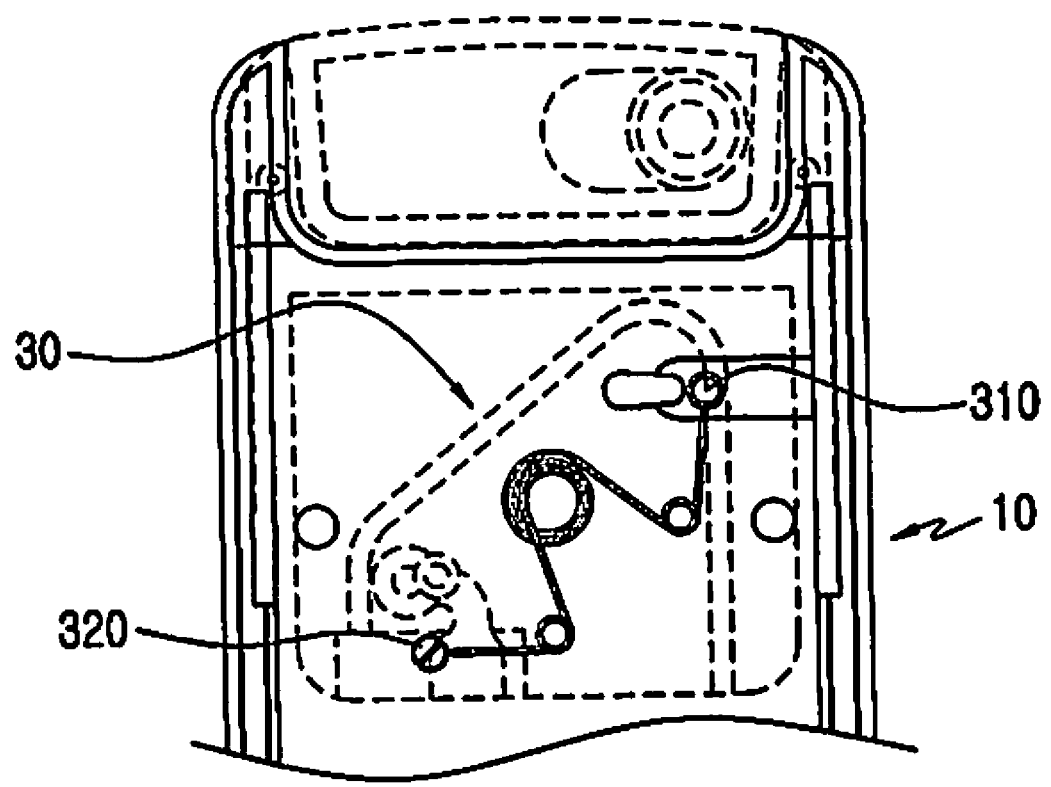
FIG. 5 is a front view illustrating a condition in which a sliding housing is closed in a portable communication terminal employing the inventive semi-automatic sliding device.
Figure 6:
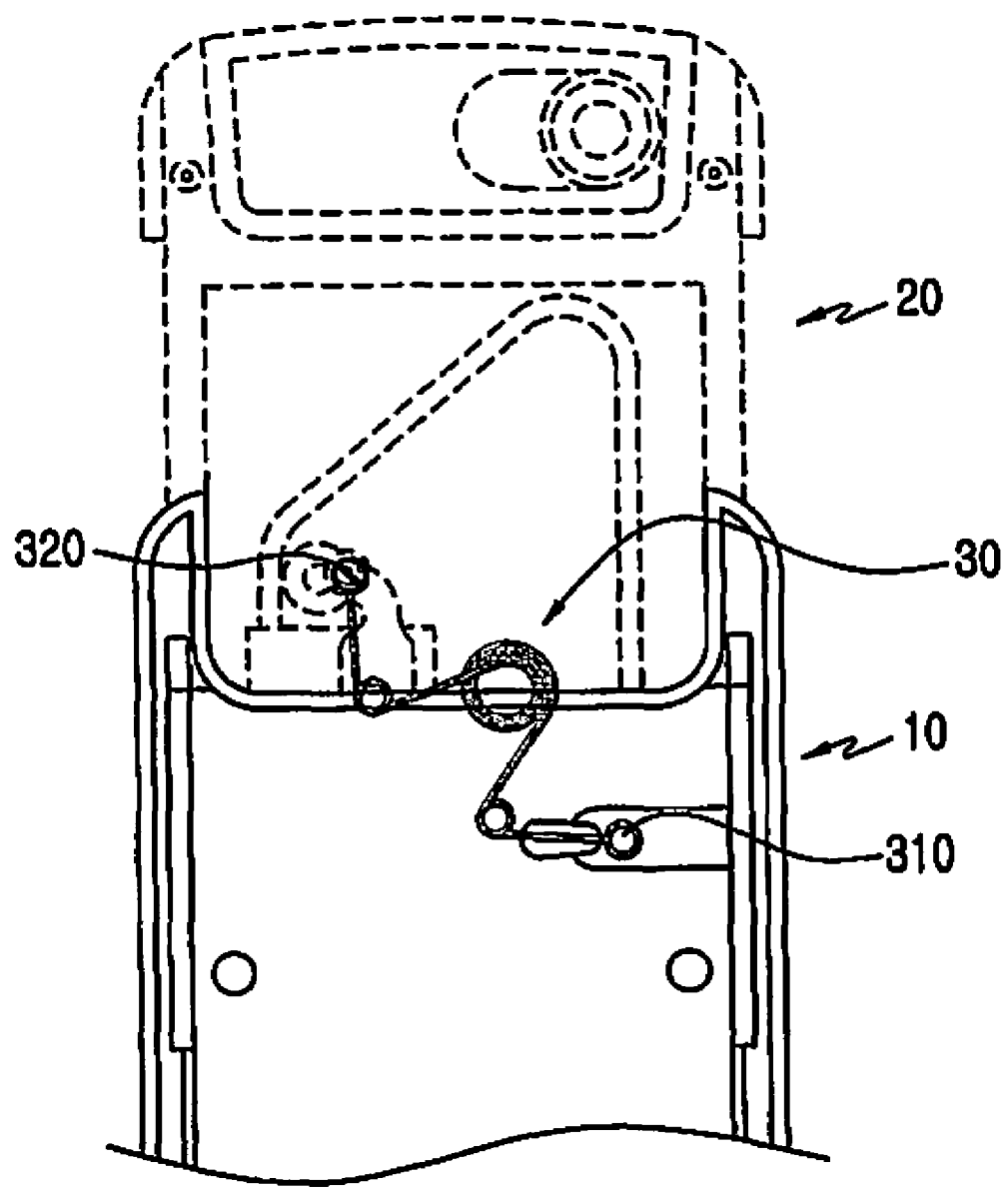
FIG. 6 is a front view illustrating a condition in which a sliding housing is opened in a portable communication terminal employing the inventive semi-automatic sliding device.

As shown in FIGS. 5 and 6, if a user applies force, the multiple torsion spring moves with the sliding housing until the sliding housing moves by a predetermined distance. At this time, the first and second coil spring sections and the central coil spring section are adapted to move along predetermined tracks, respectively. If the sliding housing moves beyond the predetermined distance, the sliding housing is automatically moved to the final position by the elastic force of the multiple torsion spring.

As described above, the present invention provides a multiple torsion spring which is advantageous for sliming a portable communication terminal. In particular, because the inventive multiple torsion spring has three coil spring sections arranged in a zigzag pattern, the deformation of the torsion spring can be maximized, and the elastic force exerted by the torsion spring can be increased. In addition, the inventive torsion spring is configured in such a manner that the three coil spring sections move along predetermined tracks, respectively. As a result, it is possible to remove a dead section or a dead point while the sliding housing is being slid. Furthermore, according to the present invention, the distances from the central coil spring section to the first and to the second coil spring sections are reduced. This is advantageous in miniaturizing such a multiple torsion spring and makes it possible to minimize the vertical floating of the sliding housing when the sliding housing moves in the longitudinal direction thereof. Moreover, the configuration of the torsion spring is very simple. As a result, the steps of fabricating such a torsion spring can be reduced, whereby the manufacturing costs can be reduced.

While the invention has been shown and described with reference to certain preferred embodiments thereof, it will be understood by those skilled in the art that various changes in form and details may be made therein without departing from the spirit. Therefore, it should be appreciated that the scope of the invention is determined by the appended claims rather than by the embodiments described above.

What is claimed is:

1. A spring employed in a semi-automatic sliding device for a sliding-type portable communication terminal, comprising opposite ends and at least two coil spring sections located between the opposite ends, the spring being formed in a zigzag shape,
   wherein the at least two coil spring sections comprises a first coil spring section, a central coil spring section connected to the first coil section and wound spirally at least two times, and a second coil spring section connected to the central coil spring section and positioned in symmetry to the first coil spring section about the central coil spring section, and
   wherein each of the first and second coil spring sections is wound once, and the central coil spring section is wound at least two times, the central coil spring being formed in such a manner that the diameters of the turns thereof are reduced when approaching the center of the central coil spring, thereby being formed in a slim shape.

2. A spring as claimed in claim 1, wherein the spring is formed in a "W" shape.

3. A spring as claimed in claim 1, wherein the first and second coil spring sections exert elastic force in a direction rendering them to be spaced away from each other.

4. A spring as claimed in claim 1, wherein the central coil spring section exerts elastic force in the direction rendering the opposite ends to be spaced away from each other.

5. A semi-automatic sliding device for a sliding-type portable communication terminal which includes a main housing, a sliding housing, and a semi-automatic sliding device for opening or closing the sliding housing in relation to the main housing, the semi-automatic sliding device comprising:
   a top surface of the main housing;
   a bottom surface of the sliding housing; and
   a multiple torsion spring comprising a fixing end rotatably fixed to the top surface of the main housing at a predetermined position, a moving end rotatably fixed to the bottom surface of the sliding housing at a predetermined position and moving with the sliding housing, and at least two coil spring sections located between the fixing end and the moving end, the multiple torsion spring being formed in a zigzag shape,
   wherein the at least two coil spring sections comprises a first coil spring section, a central coil spring section connected to the first coil section and wound spirally at least two times, and a second coil spring section connected to the central coil spring section and positioned in symmetry to the first coil spring section about the central coil spring section, and
   wherein each of the first and second coil spring sections is wound once, and the central coil spring section is wound at least two times, the central coil spring being formed in such a manner that the diameters of the turns thereof are reduced when approaching the center of the central coil spring, thereby being formed in a slim shape.

6. A semi-automatic sliding device as claimed in claim 5, wherein the spring is formed in a "W" shape.

7. A semi-automatic sliding device as claimed in claim 5, wherein the first and second coil spring sections exert elastic force in the direction rendering them to be spaced away from each other, and the central coil spring section exerts elastic force in the direction rendering the opposite ends to be spaced away from each other.

8. A semi-automatic sliding device as claimed in claim 5, wherein each of the fixing end and the moving ends is provided with a rivet, respectively, so that the rivets can be anchored at bottom side of the main housing and the top side of the sliding housing, respectively, the rivets being engaged with the fixing end and the moving end through insert-injection molding.

* * * * *